(12) United States Patent
Kuster (10) Patent No.: US 10,867,619 B1
(45) Date of Patent: Dec. 15, 2020

(54) USER VOICE DETECTION BASED ON ACOUSTIC NEAR FIELD

(71) Applicant: Apple Inc., Cupertino, CA (US)

(72) Inventor: Martin Kuster, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 127 days.

(21) Appl. No.: 16/151,238

(22) Filed: Oct. 3, 2018

Related U.S. Application Data (63) Continuation of application No. 16/136,936, filed on Sep. 20, 2018, now abandoned.

(51) Int. Cl.
| | |
|---|---|
| G10L 25/00 | (2013.01) |
| G10L 25/03 | (2013.01) |
| G10L 25/78 | (2013.01) |
| G10L 15/20 | (2006.01) |

(52) U.S. Cl.
CPC .............. *G10L 25/03* (2013.01); *G10L 15/20* (2013.01); *G10L 25/78* (2013.01); *G10L 2025/783* (2013.01)

(58) Field of Classification Search
CPC ................................ G10L 25/78; G10L 25/87
See application file for complete search history.

(56) References Cited

U.S. PATENT DOCUMENTS

| | | | | |
|---|---|---|---|---|
| 2006/0233389 A1* | 10/2006 | Mao | ........................ | H04R 1/406 381/92 |
| 2009/0180627 A1* | 7/2009 | Boehme | ............... | G10K 11/178 381/56 |
| 2009/0214053 A1* | 8/2009 | Reining | .................... | H04R 1/38 381/92 |
| 2010/0211387 A1* | 8/2010 | Chen | ........................ | G10L 25/78 704/226 |
| 2011/0013075 A1* | 1/2011 | Kim | ........................ | H04N 5/602 348/370 |
| 2014/0052406 A1 | 2/2014 | Chen et al. | | |
| 2015/0024799 A1 | 1/2015 | Swanson | | |
| 2019/0214011 A1* | 7/2019 | Shin | ........................ | G10L 15/22 |

OTHER PUBLICATIONS

Investigation of volume velocity source based on two-microphone method for measuring vibro-acoustic transfer functions, by Andreas P. Schuhmacher; Proceedings of the 2008 International conference onmodal analysis noise vibration engineering (SMA); Published 2008.

Particle velocity estimation based on a two-microphone array and Kalman filter, by Mingsian R. Bai, Shen-Wei Juan, and Ching-Cheng Chen;J Acoust Soc Am., Mar. 2013.

(Continued)

*Primary Examiner* — Daniel Abebe
(74) *Attorney, Agent, or Firm* — Womble Bond Dickinson (US) LLP (57) ABSTRACT

Processing sound received by a device can include receiving a first signal from a first microphone of the device and a second signal from a second microphone of the device, where the first and second microphones capture sounds from a sound field. A ratio between the acoustic pressure and the particle velocity of the sound field can be calculated. In response to the ratio exceeding a threshold, speech signal processing is performed on one or more of the microphone signals. Other aspects are also described and claimed.

21 Claims, 6 Drawing Sheets

(56) References Cited

OTHER PUBLICATIONS

"Way does a microphone membrane only measure pressure and not particle velocity?", Physics Stack Exchange, retrieved from the Internet <<https://physics.stackexchange.com/questions/105092/why-does-a-microphone-membrane-only-measure-pressure-and-not-particle-velocity>>, Mar. 25, 2014, 3 pages.

"How can I use two microphone method to calculate acoustic particle velocity?", Research Gate, retrieved from the Internet <<https://www.researchgate.net/post/How_can_I_use_two_microphone_method_to_calculate_acoustic_particle_velocity>>, Feb. 25, 2020, 11 pages.

Seybert, A.F., et al., "Experimental determination of acoustic properties using a two-microphone random-excitation technique", J. Acoust. Soc. Am., vol. 61, No. 5, May 1977, pp. 1362-1370.

* cited by examiner

PLAN VIEW

FIG. 4

SIDE VIEW

USER VOICE DETECTION BASED ON ACOUSTIC NEAR FIELD

This application is a continuation of pending U.S. patent application Ser. No. 16/136,936, filed Sep. 20, 2018.

FIELD

One aspect of the disclosure herein relates to detecting sound by digital signal processing of microphone signals, and more particularly to detecting that a user's voice is emanating from a near field. Other aspects are also described.

BACKGROUND

Automatic speech recognition is commonly used by devices, for example, mobile phones, headsets, speakers, and other electronics. The term "speech recognition" as used here refers to the digital processing of an audio signal by a processor to detect voice (speech) activity and/or to translate detected speech into meaning or words, for example, through natural language processing or equivalent technologies. Devices can use speech recognition to provide a rich interactive experience for users. Examples of providing such an experience include a virtual assistant which responds to an initial phrase spoken by a user, for example, if a user says "Hey Hal", the virtual assistant can detect subsequent additional voice commands from the user.

SUMMARY

The sound field picked up by one or more microphones of a device can contain competing sounds, for example, multiple voices or ambient noise. Thus, a problem exists as to how to select or isolate a particular sound for purposes of performing speech processing thereon, so that only a user's voice is processed. In some cases, it may be advantageous to perform speech processing on a voice that is in the near field of a microphone (to which for example a virtual assistant then responds) while speech that originates from far (or in the far field) is ignored by the virtual assistant.

Detecting whether a sound is originating from a user (or a users voice has been detected) can be advantageous because the sound can in that case be processed for speech processing, while ignoring other (irrelevant) sounds. It is to be understood that speech processing may encompass speech recognition, speech enhancement, speaker/talker recognition, and other signal processing techniques relating to speech and voice signals. If a sound is detected as originating from a human user, the sound can be processed for speech enhancement, which can make the speech more intelligible, for example, during telephony (e.g., a voice call, or a video call). Additionally or alternatively, the sound can be processed for speech detection and used for responding to voice commands and/or converted to symbols (for example, text).

'Near field' can be understood as a part of a sound field, relatively near a sound source (for example, within two wavelengths, one wavelength, or closer), where the sound pressure may not obey the inverse square law and the particle velocity may not be in phase (or may be substantially out of phase) with the sound pressure. Far field describes a region some distance away from the sound source where the sound level obeys the inverse square law (for example, the sound level decreases by 6 dB for each doubling of distance from the source, and the particle velocity is in phase, or substantially in phase, with the sound pressure). The near field and far field regions can be understood as a continuum, without a clear separation between the two. As discussed further herein, however, a separation between near field and far field can be defined by comparing an acoustic pressure with a particle velocity, and defining a threshold.

Furthermore, although a location of a sound source (and thus, the nearness of the sound) can be detected by a microphone array through triangulation for example, a reliable resolution can require a high number of microphones. The number of microphones that are present in many consumer electronic devices, however, are sometimes limited by both physical factors (for example, space and power consumption) and economic factors (for example, cost and device complexity). Such methods may also not be very successful when sound sources are very close to all microphones in the microphone array. Thus, a method using a low number of microphones (for example, only two microphones) that is capable of detecting sounds originating very near the microphones is desirable.

It should be understood that, for this application, the term "speech recognition" shall include the processing of an audio signal by a processor to detect speech, and/or to translate the detected speech into meaning or words, for example, through natural language processing or equivalent technologies. The words can be mapped to commands that can be responded to by a device or a method performed by a processor. Speech recognition can be processor intensive; therefore performing speech recognition continuously, e.g., during an "always listening" mode of a virtual assistant, may take up valuable processor resources. Thus, it can be beneficial to provide a trigger for when to process the sound. When speech or other sound originates in the near field, this can provide a reliable trigger for when to start processing the sound for a virtual assistant.

Furthermore, a sound field can contain various speakers (talkers). It may be unclear which of the various speakers should be 'obeyed' (in the case of processing commands/requests for a virtual assistant). Known techniques may include analyzing an audio signal for speech profiles and matching detected speech profiles with a user. A device can then decide which speaker to obey based on the matched speech profile. This too, can be processor intensive. Limiting such processing to only sounds that have been detected to be in the near field can simplify the process of selecting which speech amongst that of several talkers shall be obeyed.

Therefore, it is contemplated that audio devices (for example smart speakers, headsets and smartphones in particular) be configured in accordance with digital signal processing algorithms that can detect the proximity of a sound relative to two or more microphones of the device, and use the detected proximity as a proxy for selecting a sound to process for speech processing. Sounds that are determined to be sufficiently close to the microphones (for example, in the near field) are processed, based on an assumption that the closer the sound is to the microphones, the more likely the sound is to be emanating from a user that wishes to or is authorized to interact with the device. This can be particularly useful in the case of head-worn devices such as headsets, but can also be useful for other devices such as smart speakers, smart phones, tablets, and laptops.

In one aspect, a method for processing audio signals by a device includes: receiving a first audio signal from a first microphone of the device and a second audio signal from a second microphone of the device, where the first and second microphones capture sounds in a sound field. The first signal and the second signal can be transformed to the frequency domain. A ratio between an acoustic pressure and a particle velocity of the sound field can be calculated based on the first signal and the second signal (for example, in the frequency domain). A signal derived from the first and second audio signals is processed for speech processing in response to the ratio being greater than a threshold, but not when the ratio is lower than the threshold. Thus, in one instance, the process effectively performs speech processing for the sound field only in time intervals during which a sound source is detected as being in a near-field of the microphones.

In another aspect, an audio system for processing sound includes: a first microphone; a second microphone; and a processor, configured to: receive a first signal from the first microphone and a second signal from the second microphone, the first and second microphone capturing sounds from a sound field; process the first signal and the second signal including converting the first signal and the second signal to the frequency domain; determine a first acoustic pressure of the sound field based on a) the first signal, b) the second signal, or c) the first signal and the second signal; determine a first particle velocity of the sound field based on a difference between the first signal and the second signal; calculate a first ratio between the first acoustic pressure and the first particle velocity; and in response to the first ratio being greater than a threshold, determine whether a sound from the sound field is emanating from a near field or a far field.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the disclosure is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Audio System and Device

Figure 1:
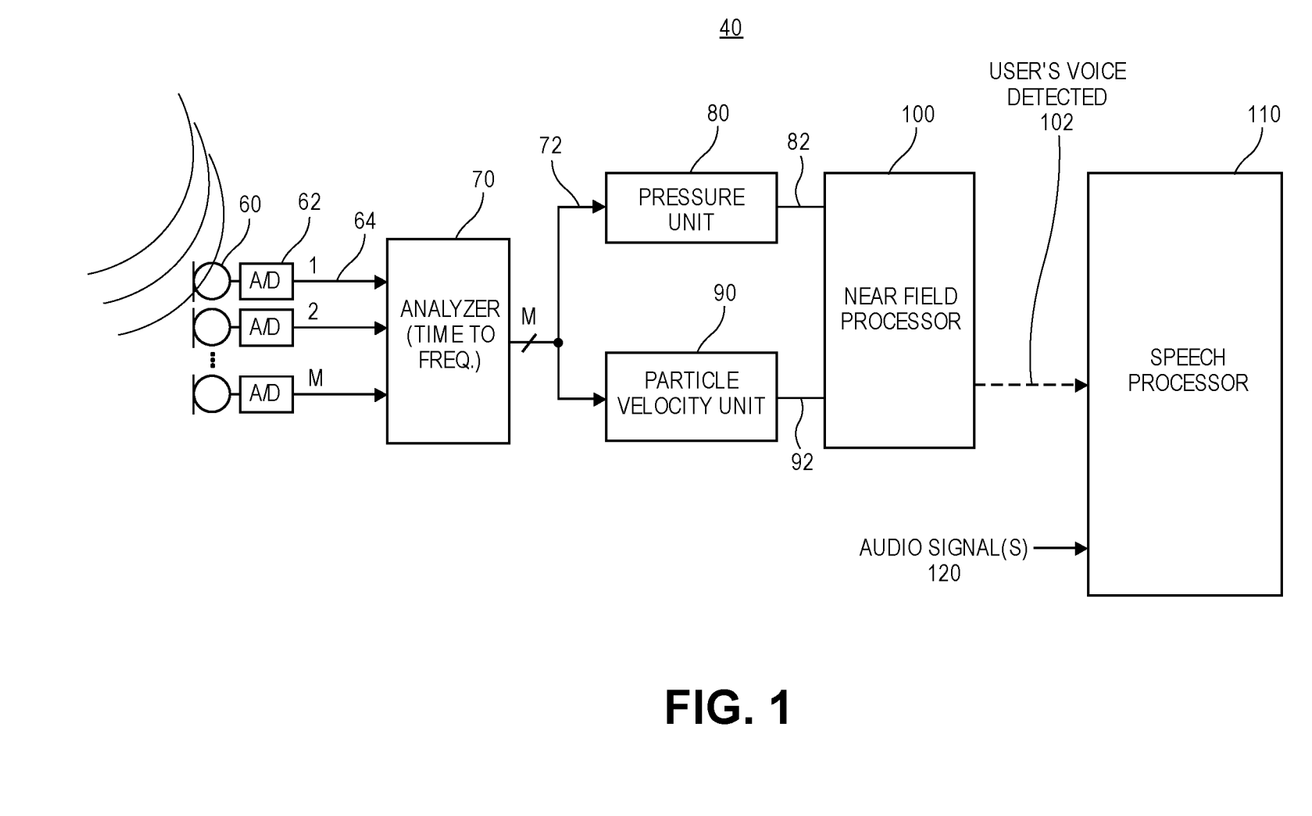
FIG. 1 illustrates a diagram of an audio system or device that detects whether or not a sound is in a near field.

Referring now to FIG. 1, an audio system or device 40 is shown relating to detecting sound. In one aspect, the audio system 40 (which can take the form of a device or article of manufacture) can be, for example, a laptop computer, a desktop computer, a mobile phone, a smart phone, a tablet computer, a smart speaker, home audio system, any consumer electronics device with audio capability, and an audio system in a vehicle (for example, an infotainment system for an automobile), a headset (e.g., a single earphone or a pair of left and right earphones).

Microphones

A plurality of M microphones 60 capture sound in a sound field 50. The microphones 60 can have known, fixed, and/or determinable relative positions and sensitivities, thereby usable for example as a microphone array. The analog signals from the microphones are converted to M digital audio signals 64, respectively, by analog to digital converters 62.

In one aspect, each of the microphones has an omnidirectional pattern. In one aspect, the microphones are well-matched microphones having substantially the same sensitivity, frequency response, and/or polar pattern. In one aspect, the microphones are phase adjusted and/or amplitude adjusted microphones. In one aspect, the microphones are pressure microphones. In one aspect, the microphones have cardioid, supercardioid, hypercardioid, figure-eight, or ultra-directional patterns.

In one aspect, the process described here for making a near field detection of sound relies on only two microphones. For example, the process can determine when a sound originates from the near field relying on only two microphones, by calculating an acoustic pressure, a particle velocity, and a ratio of such, based on only signals from the two microphones, as described herein. Advantageously, such a configuration simplifies the manufacturing and development of the device, and reduces overall cost by limiting the number of microphones needed in the device.

In another aspect, the device has at least four microphones, located at opposite sides of the device (for example, a headset with two microphones on each side). Advantageously, such a configuration allows for redundancy and verification of detected near field speech, as described herein.

In another aspect, the device has three or more microphones. The three or more microphones can be aligned along an axis. The three or more microphones can be aligned along an axis worn on the same side of a user (for example, over a single ear on a headset). In another aspect, the device has three or more microphones on a first side and one or more microphones on a second side.

Analyzer

In one aspect, an analyzer 70 converts the M digital audio signals into M frequency domain signals 72 (each being a sequence over time of segments or frames of sub-band values). The analyzer 70 can transform each digital audio signal on a frame by frame basis into corresponding frequency domain signals (also referred to as the spectral domain). For example, the time-frequency analysis can be performed using known methods, for example, a Fourier transform, filter banks, discrete Fourier transform (DFT), Fast Fourier Transform (FFT), short time Fourier Transform (STFT), or other equivalent time-frequency analysis techniques known in the art. In one aspect, the Analyzer 70 can transform the microphone signals into frequency domain signals 72, where each frequency domain signal can be in the form of sub-bands (for example, frequency bands or bins) of segmented time frames.

In one aspect, the analyzer can filter the signals or generate averages for one or more of the signals (for example, using Welch's method or calculating the power spectral density) at different time frames. Thus, in one aspect, the frequency domain signals 72 can be filtered or averaged frequency domain signals. The acoustic and particle velocity calculations described below can be computed based on the raw frequency domain audio signals or based on filtered/averaged versions of them, where the latter can lead to improved results (to eliminate adverse effects of irregularities and spikes in the signals).

Acoustic Pressure Unit

An acoustic pressure unit 80 can calculate or estimate a pressure of the sound field 50. In one aspect, the pressure is calculated based on a pressure measurement of a single digital audio signal from a microphone. In another aspect, the pressure is calculated based on summing two or more digital audio signals 72. In another aspect, the pressure is calculated based on averaging (summing the audio signals 72, and dividing by the number of summed signals) to calculate an average acoustic pressure. The acoustic pressure calculation (regardless of whether a single microphone signal is used, or if multiple microphones are summed or added) characterizes a monopole pattern.

Particle Velocity Unit

A particle velocity unit 90 can calculate or estimate the particle velocity of the sound field 50. In one aspect, the particle velocity is determined by finite difference approximation between the audio signal from the first microphone and the second microphone. In one aspect, the particle velocity is determined by computing a difference between the acoustic pressures of two audio signals (for example, from a first microphone and second microphone among microphones 60).

A "difference" is understood to refer to not just subtraction, but also a ratio calculation (or division) as well. Similarly, a "summing" is understood not just to refer to addition, but also multiplication as well. It should be noted that the calculations of acoustic pressure and particle velocity, as shown in FIG. 1, can be performed on the frequency domain signals 72 of time domain audio signals 64. The frequency domain signals 72 can (but can also not) be filtered, averaged, or PSD values of the original frequency domain signals (generated from the time domain signals).

In one aspect, particle velocity is characterized or calculated as an axial component in a direction along an axis through two or more microphones. This component has a cos (θ) directivity, where theta=0 on the axis. Beneficially, near field sources from the sides will not be detected because those sounds will not have a substantial component along the axis through the microphones. The u/p ratio (where u is particle velocity and p is pressure) is the highest for near-field sources directly on the axis.

Figure 3:
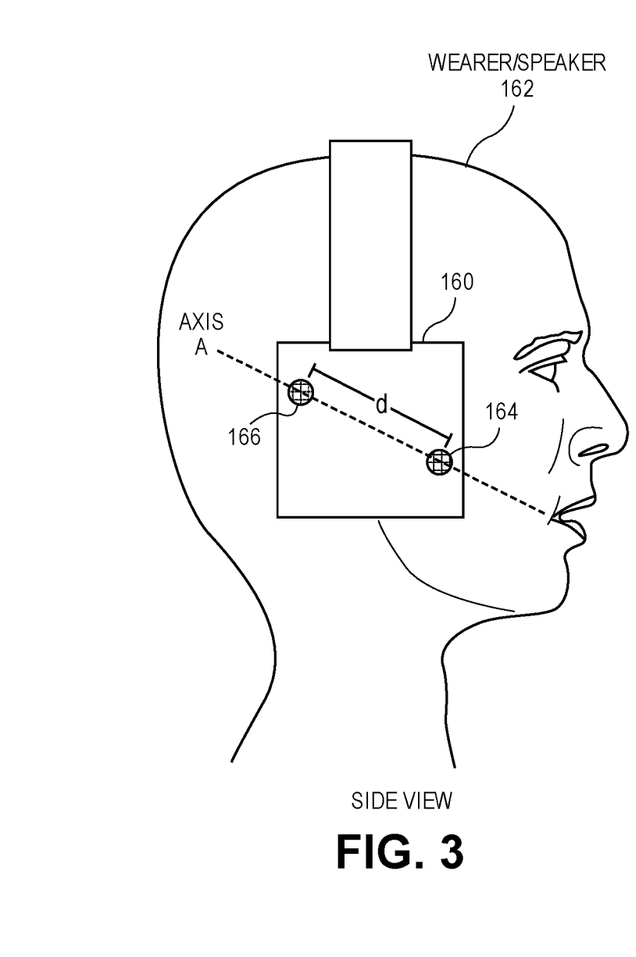
FIGS. 3-5 illustrate aspects of an audio system.
Figure 8:
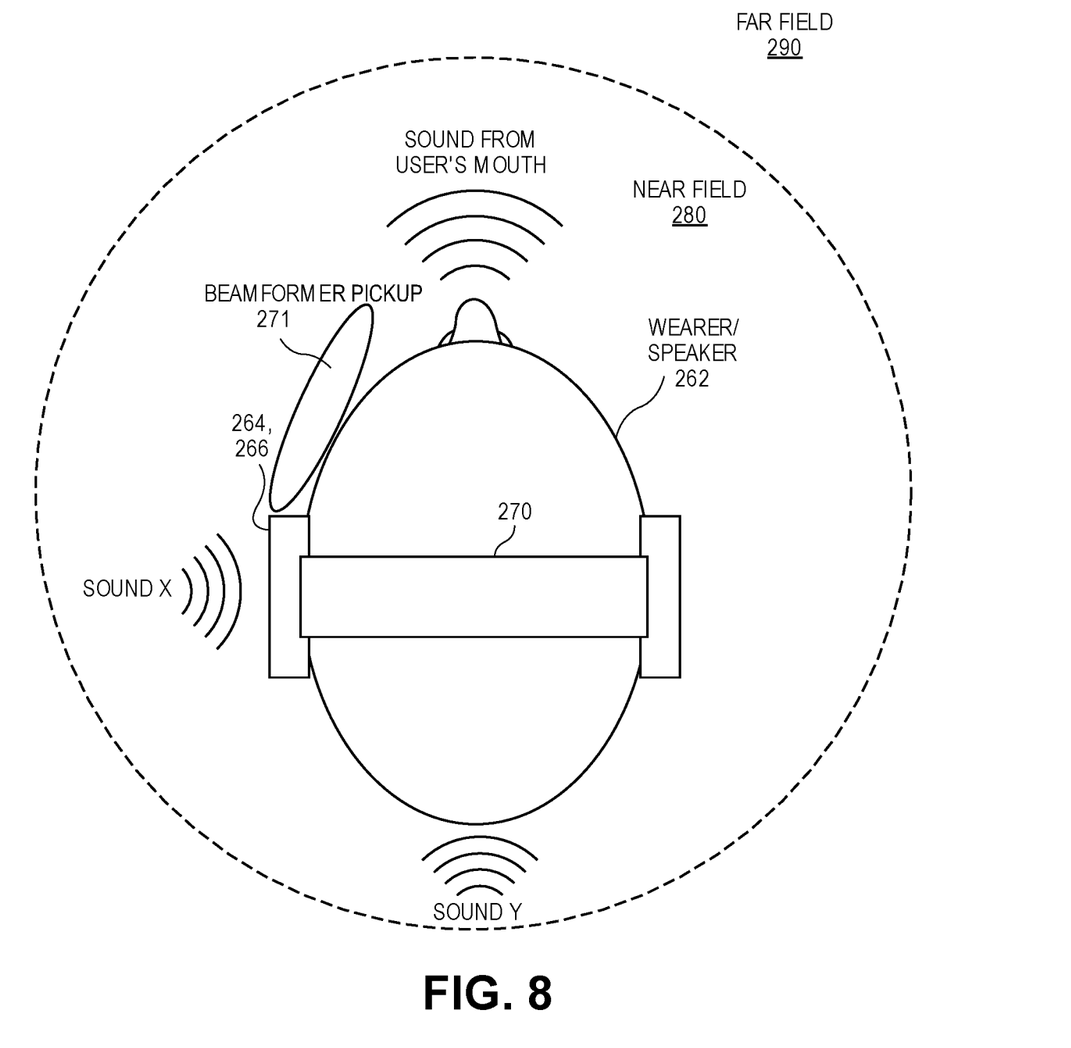
FIG. 8 shows a near field and a far field of a sound field.

For example, FIG. 8 shows one aspect of headset with microphones 264 and 266 that are located along an axis (for example, as shown in FIG. 3). As described above, near field sources from the sides such as 'Sound X' will not have a substantial component along the axis through the two microphones, and therefore will not trigger as a near field sound. Beneficially, this can reduce false triggers of near field sounds that do not originate from the wearer's mouth. The u/p ratio is the highest for sounds originating from a user's mouth and from the back of a user's head—'Sound Y'—which can create an ambiguity as to which direction the sound is coming from. The ambiguity can be resolved by employing a beamformer pickup 271 towards the user's mouth. This signal will be low for sound sources originating from the back of the head, and high for sound from the users mouth, thereby resolving ambiguity of whether the sound is originating from the user's mouth or from behind the user's head. Thus, combining near field detection with a beamformer may beneficially reduce false triggers of sounds coming from the side and the back of a user's head.

In one aspect, the particle velocity is determined or approximated based on a finite difference technique, $$u_x = \frac{j}{\rho_0}\frac{\partial p}{\partial x} \approx \frac{j}{\rho_0 \omega} \cdot \frac{p_2 - p_1}{\Delta x}$$

where $u_x$ is particle velocity having a direction x, $j=\sqrt{-1}$, $\rho_0$ is air density, and ω is angular frequency, $$\frac{\partial p}{\partial x}$$

is the pressure gradient in the direction x, which can be approximated using a two-point finite difference technique, $$\frac{p_2 - p_1}{\Delta x},$$

where p1 and p2 are pressure measurements at two adjacent points and $\Delta x$ is the distance between the two pressure sensors (for example, microphones) from which the pressure measurements were captured.

In one aspect, the particle velocity is determined by computing a difference between an acoustic pressure of a first microphone signal and an acoustic pressure of a second microphone signal, for example, $$u \approx \frac{p_2 - p_1}{\Delta x}$$

or $u \approx p_2 - p_1$. In one aspect, $p_2$ is the pressure calculated from a microphone closer to the sound (for example, from a microphone located closer to a user's mouth) and $p_1$ is the pressure calculated from the microphone located relatively farther from the sound.

In one aspect, as the number of microphones increase above two, the particle velocity term is expressed and calculated as a higher order derivative while the sound pressure remains expressed and calculated as a zeroth order derivative. Thus, by taking a partial derivative with respect to a distance 'r' from the sound source, or by approximating the derivative by finite difference method, the near field term beneficially becomes more pronounced as the microphone count increases.

Near Field Processor

A near field processor 100 can determine whether a sound in the sound field 50 (captured by microphones 60) emanates from a near or far field. For example, the determination can be based on comparing the computed acoustic pressure 82 and particle velocity 92.

Referring now to FIG. 8, a wearer/speaker 262 is shown wearing a headset 270. The headset includes microphones 264, 266 that capture sounds and generate audio signals based on the captured sounds. In this illustration, the near field 280 is shown as an area around the wearer/speaker 262. The far field 290 is the area outside of the near field. This illustration is not meant to depict any actual dimensions.

Referring back to FIG. 1, in one aspect, the near field processor 100 can calculate a ratio between the acoustic particle velocity 82 and acoustic pressure 92. The ratio may contain a) a far field term ($T_F$) that can be constant (not changing with respect to distance from the source of the sound) or linear (changing at a substantially constant rate with respect to distance from the source of the sound), and b) a non-linear term ($T_N$) that is substantial (for example, similar or larger in magnitude than $T_F$) when a sound is in the near field. This detection principle can be described as $p/u \propto T_F + T_N$, where the ratio between acoustic pressure and particle velocity, p/u, is proportional to, similar to, or equal to $T_F + T_N$. When a sound emanates from the far field only, $T_N$ will be negligible. In contrast, when a sound emanates from the near field, $T_N$ will be substantial, and thus, the overall ratio will increase in a non-linear manner. It shall be understood that ratio p/u can also be expressed alternatively as u/p, and that $T_{F+}T_N$ can also be expressed as $T_{F-}T_N$ or $T_{N-}T_F$.

In one aspect, when the ratio meets or exceeds a threshold, the device can determine that the sound in the sound field is emanating from the near field (for example, the device can logically determine that a user's voice is detected 102, and take appropriate action). For example, when the ratio meets or exceeds a threshold, the device can process the sound in the sound field (for example, audio signals 120) for speech processing. Audio signals 120 can be the same audio signals 60, 64, or 72 that were used to calculate the acoustic pressure and particle velocity, or any other audio signals (from other microphones) that are assumed to capture the same sound field 50. Advantageously, if the same microphones and audio signals are employed for speech processing and for near field detection, this can reduce the hardware count, complexity, and cost of the device. The device can be continuously receiving sound, analyzing the sound, and calculating the acoustic pressure and particle velocity and ratio.

In one aspect, the threshold is a single value. In another aspect, the threshold is a collection of values. In another aspect, the threshold is a range/band of values. In one aspect, the acoustic pressure, the particle velocity, and the ratio are computed on a per-frame (time-frames) and per-frequency (or only the selected frequency bins) basis.

Advantageously, the ratio between the acoustic pressure and particle velocity is insensitive in regard to how loud the source, therefore the device and process employed by the device is not dependent on the sound content loudness. Furthermore, some devices may employ accelerometers to detect whether a speaker is a nearby speaker. Such an implementation, however, can be overly sensitive to vibrations (for example walking). In contrast, the ability of device 40 to detect whether a sound originates in the near field is unaffected by mechanical vibrations.

Speech Processor

In one aspect, the speech processor 110 processes audio signals 120 when a sound is detected in the near field (for example based on the algorithm performed by the near field processor 100 on the pressure calculation 82 and the particle velocity unit 92), but does not process the audio signals when sound is not detected in the near field. For example, if the sounds in the sound field are determined to not be originating from the near field (for example they originate from the far field), then the speech processor can be idle. This beneficially prevents the device from responding to voices that are not that of the user, and also can save processor resources and energy (for example, battery life). However, when the sound is in the near field, the speech processor 110 can process audio signals 120.

In one aspect, the speech processor can process audio signals 120 for speech recognition. If speech is recognized, the device can take the appropriate action. For example, the recognized speech can be classified. Classifications can include activation or trigger words such as "Hey Device" or "Okay Device" that signal to the device that command/request words are to follow. Command/request words can be requests to perform specific actions such as "What is the weather?", "Pause", or "Skip this song". Speech recognition processing can include natural language processing, artificial intelligence, machine learning, neural networks, and other equivalent speech recognition technology. A processor will automatically perform an action in response, as a typical virtual assistant program could do, such as accessing a web site over an internet connection to obtain the latest weather report, pausing a media player, skipping the rest of the current audio file that is being played back, etc.

In one aspect, the speech processor can match speech in the audio signals 120 with speech signatures that are associated with corresponding user profiles (for example, stored in memory on the device or on a network). Matching speech signatures can be used as an additional security feature.

In one aspect, the speech processor performs speech enhancement such as speech coding and/or noise filtering on the audio signals 120. In one aspect, the audio signals 120 processed by the speech processor are the same as the audio signals captured from microphones 60, or a subset thereof. In one aspect, one or more of the audio signals 120 are beamformer output signals, formed by beamformer processing of a desired subset of the microphones 60. It is also contemplated that the audio signals 120 may include one or more audio signals that originate from one or more different microphones that are not the same as microphones 60.

Near Field Term Dominates at Speech Frequencies

Figure 7:
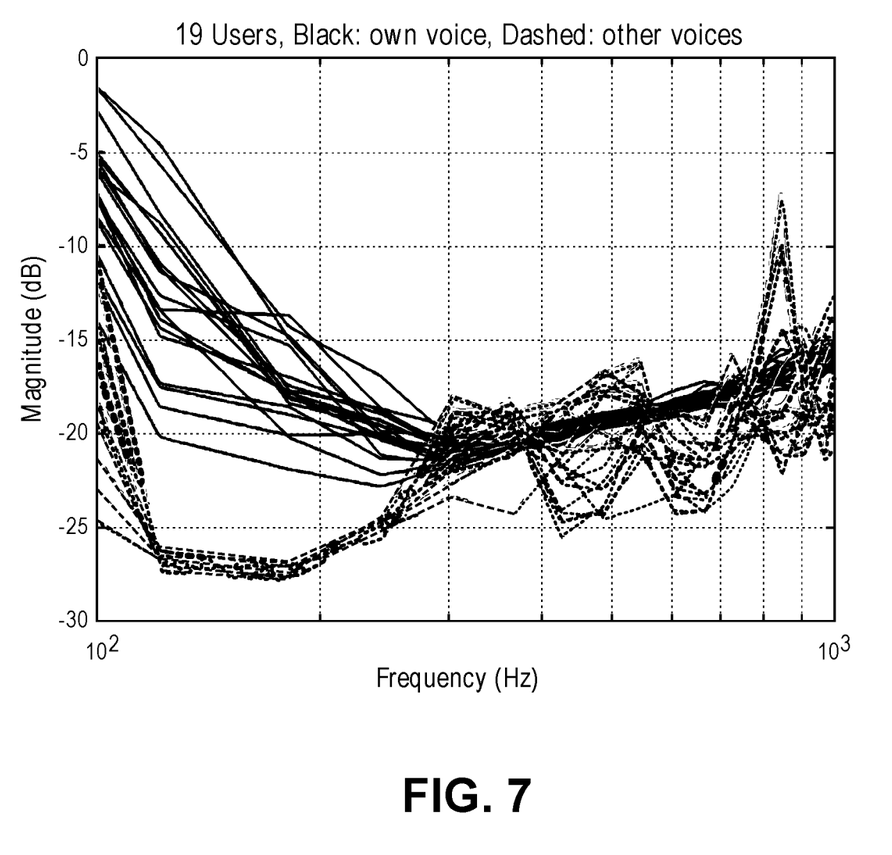
FIG. 7 shows a graph comparing a user voice with other voices.

Referring now to FIG. 7, it is shown that, among nineteen users, the ratio of pressure and particle velocity of users' own voices (being in the near field) was greater than those of other speakers' voices (being in the far field). The difference between the ratios of users' voices compared to the other speaker's voices was most pronounced near the fundamental frequencies of the speakers (for example, between 85 to 180 Hz for males and 165 to 255 Hz for females). Thus, the near field term $T_N$ (which can be seen as the difference between the users' voices and the other voices) is most substantial when a) the speech is emanating from the near field, and b) at speech frequencies. Thus, in one aspect, the calculation of the ratio can be based on selected speech frequencies; for example, between 85 Hz and 255 Hz (for example, performing the acoustic pressure and particle velocity calculations on frequency bins within selected speech frequencies of the audio signals).

In one aspect, the system can calculate the acoustic pressure and particle velocity based on selected frequency ranges (for example, frequency bins), where the frequency ranges are selected based on whether the speaker is a male or a female, historical data (prior speech), user settings (stored in memory or on a network), calibration, or combinations thereof.

Calibration

In one aspect, the system can calibrate (or select) the speech frequencies of interest, by receiving as input a user's voice at a fixed near-field location (for example via a microphone that is integrated in headset worn by the user). In this manner, the system can determine frequencies at which the ratio is most pronounced (for example, near the fundamental frequency of that particular user's voice), and thus, most likely to yield a proper determination of whether a sound is emanating from the near field.

Similarly, the system can calibrate a proper threshold for the ratio based on when $T_N$ is substantial in comparison to $T_F$. For example, the system can calculate the ratio of p/u (for example, in one or more frequency bins) for a sound at various distances from the microphones 60 (or representative microphones with similar characteristics and relative locations) to determine a point when a) $T_N$ becomes substantial, and/or b) the inverse square law is does not hold, and/or c) the particle velocity and acoustic pressure are substantially out of phase. At such a point, the value of the ratio, p/u, can be set as the threshold. Various thresholds can be calculated corresponding to different fundamental frequencies of voices. A threshold can then be matched to a particular frequency based on a detected frequency in the sound. The threshold or thresholds can be stored in memory on the system or device, and/or on a networked server capable of being downloaded on the device, and/or set or modified through a user interface. In one aspect, the thresholds can be modified based on historical usage (for example, recognized speech) of the device.

Other Aspects

Referring now to FIG. 3, a first microphone 164 can be located on a device 160 (for example a headset), the first microphone being located closer to a mouth of a wearer or user 162. A second microphone 166 can be located on the device further away from the mouth of the user. In one aspect, the two microphones are located on the same side of the device, worn on the same side of the head of the user, as shown in FIG. 3. In one aspect, the microphones 164, 166, (and/or microphones 174, 176 of FIG. 4) are aligned in an axis 'a' that runs approximately to the user's mouth. Advantageously, the alignment provides accurate particle velocity estimation due to the straight line from the source of the sound (the mouth) through both microphones. In one aspect, a distance d between the first and second microphones 164, 166 (and/or between microphones 174, 176 of FIG. 4) is 5 mm to 40 mm.

Figure 4:
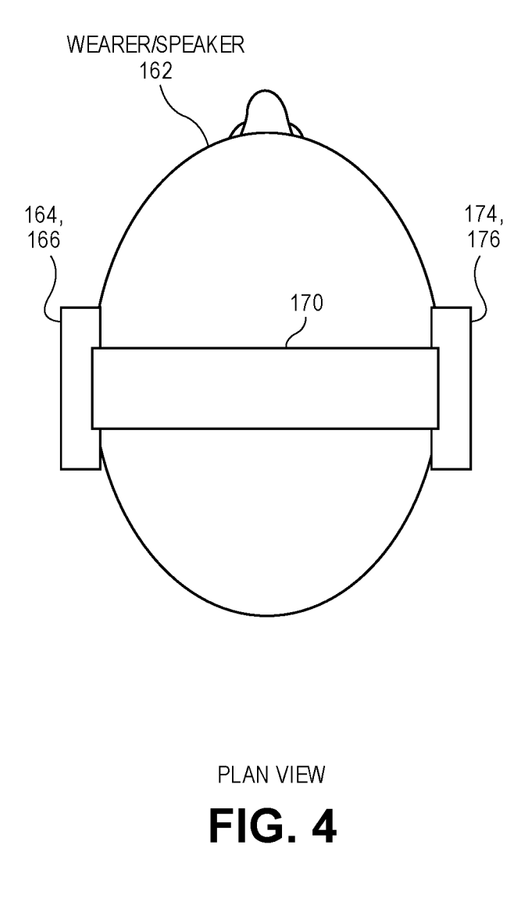

As shown in FIG. 4, in one aspect, the device is a headset (for example, a device worn on a head or a device worn within, over or around one or more ears of a user) having the first and second microphones 164, 166 located on a first side of the device to be worn on one side of the user, and a third and fourth microphone 174, 176 located on a second side of the device worn on the other side of the user. Advantageously, an acoustic pressure, particle velocity, and/or ratio based on the third and fourth microphone can be used to verify a near field determination based on the first and second microphone. Thus, the system can utilize redundancy to prevent false positives which provides a more robust detection system. Furthermore, sound level equality between the first side and the second side can indicate that a near field source originates at an equal distance between the first side and the second side (in the bi-section plane). This can serve as an indication that that the sound is the user's voice. Thus, in one aspect, near field detection includes comparing sound levels of one or more audio signals from the first side of the device, with one or more audio signals from the second side of the device. When the two sides are equal, or within a threshold level of each other, this can further confirm that a sound is originating from the user's mouth.

Figure 5:
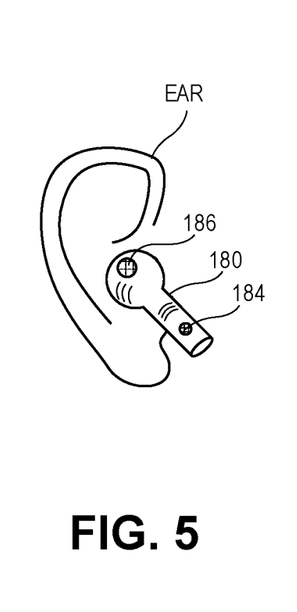

As shown in FIG. 5, in one aspect, the device 180 can be an earbud that fits snuggly in a user's ear with a first microphone 184 and a second microphone 186. In one aspect, the device 180 can be a wireless device, having wireless communications and an onboard energy storage system (for example batteries). Such systems can be located within or on a housing of the device.

It should be understood that the features described relating to FIGS. 3-5 are not limited to headsets and can also extend to other devices such as a laptop computer, a desktop computer, a smart phone, a tablet computer, a smart speaker, home audio system, any consumer electronics device with audio capability, and an audio system in a vehicle.

Process of User Voice Detection Based on Acoustic Near Field

Figure 2:
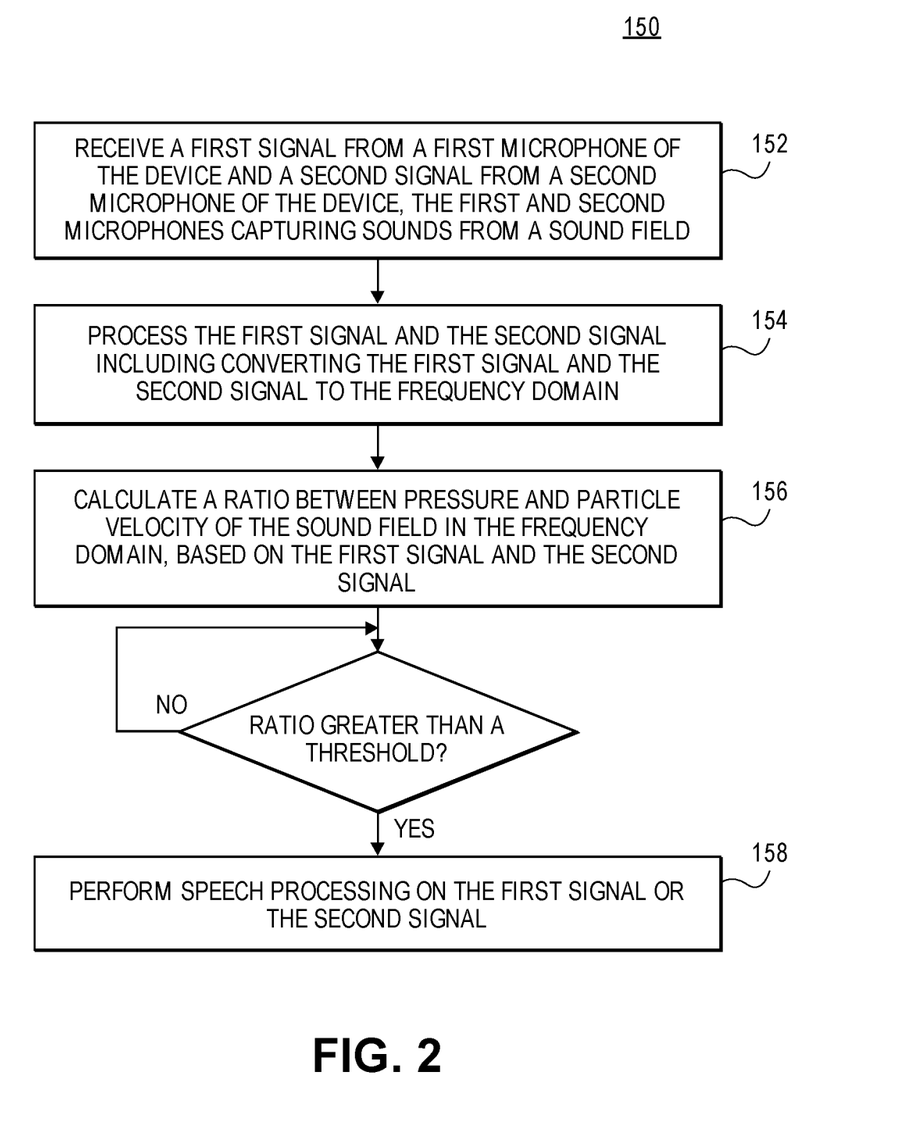
FIG. 2 illustrates a flow diagram for a process that detects sound.

FIG. 2 illustrates a flowchart for speech processing based on near field detection in accordance with one example aspect. The following aspects may be described as a process 150, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc. Process 150 may be performed by processing logic that includes hardware (for example circuitry, dedicated logic, etc.), software (for example, embodied on a non-transitory computer readable medium) that is being executed by a processor, or a combination thereof.

Referring to FIG. 2, in block 152, the audio system can receive a first signal from a first microphone of the device and a second signal from a second microphone of the device, the first and second microphones capturing sounds from a sound field. In block 154, the audio system can process the first signal and the second signal including converting the first signal and the second signal to the frequency domain. In block 156, the audio system can calculate a ratio between pressure and particle velocity of the sound field in the frequency domain, based on the first signal and the second signal.

If the ratio is determined to be greater than a threshold, then the audio system can, in block 158, process an audio signal (for example, the first signal or the second signal) for speech processing. The speech processing can include speech recognition and/or speech enhancement. In one aspect, a mixture of two or more microphone signals can be processed, for example, as one or more beamformed signals formed from the microphone signals.

In one aspect, in block 158, the audio signal can be processed for speech enhancement by attenuating or filtering non-speech sound(s) in the audio signal such as noise or far field sounds or filtering frequencies outside of the voice frequency bands. Additionally or alternatively, speech coding can be performed on the speech in the audio signal to increase intelligibility while compressing the audio signal. The enhanced speech can be transmitted, for example, for telephone calls. The enhanced speech can also be fed as an input to be processed for speech recognition.

In one aspect, the process is repeated continuously and performed live or in real-time. It should be understood that real-time and live means that the process is performed concurrent with the sound and the sound field, with minimal delay (for example, due to processing delays, transmission delays, buffering delays).

In one aspect, the near field determination (for example, when the ratio is met or exceeded) is used in combination with other known methods, for example, triangulation, and/or an accelerometer(s), to determine if the sound is emanating from the near field.

In one aspect, when the ratio is determined to be greater than a threshold, it is determined that a sound is originating from the near field, which indicates that an audio signal contains a user's voice. Based on such a determination, other actions such as speech processing can be taken.

Example Hardware

Figure 6:
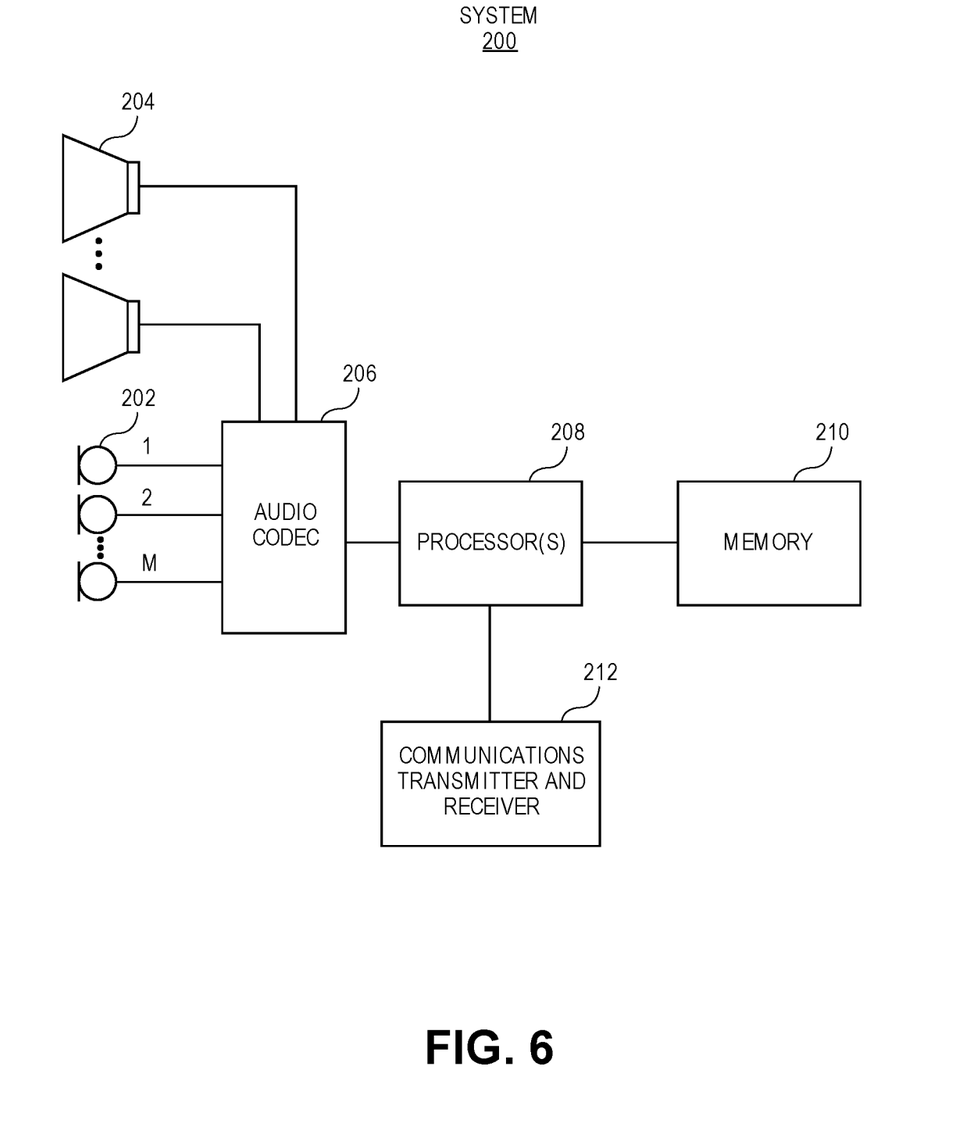
FIG. 6 shows a block diagram of an audio system.

FIG. 6 shows a block diagram for explaining an example of an audio processing system hardware which may be used with any of the aspects described herein. Note that while FIG. 6 illustrates the various components of an audio processing system that may be incorporated into headphones, speaker systems, microphone arrays and entertainment systems, it is merely one example of a particular implementation and is merely to illustrate the types of components that may be present in the audio processing system. FIG. 6 is not intended to represent any particular architecture or manner of interconnecting the components as such details are not germane to the aspects herein. It will also be appreciated that other types of audio processing systems that have fewer components than shown or more components than shown in FIG. 6 can also be used. For example, some operations of the process may be performed by electronic circuitry that is within a headset housing while others are performed by electronic circuitry that is within another device that is communication with the headset housing, e.g., a smartphone, an in-vehicle infotainment system, or a remote server. Accordingly, the processes described herein are not limited to use with the hardware and software of FIG. 6.

FIG. 6 is an example implementation of the audio systems and methods described above in connection with FIGS. 1-5, that have a programmed processor 208. The components shown may be integrated within a housing, such as that of a smart phone, a smart speaker, or a headset. These include microphones 1 through M 202 which may have a fixed geometrical relationship to each other (and are therefore treated as a microphone array.) The audio system 200 can include speakers 204.

The microphone signals may be provided to the processor 208 and to a memory 210 (for example, solid state non-volatile memory) for storage, in digital, discrete time format, by an audio codec 206. The processor 208 may also communicate with external devices via a communications transmitter and receiver 212, for example, to communicate over the internet. The processor 208 is used generically here as encompassing a single processor or a plurality of processors.

The memory 210 has stored therein instructions that when executed by the processor 208 perform the audio processes described herein. Note also, that the modules described in FIG. 1 (for example, analyzer 70, acoustic pressure unit 80, particle velocity unit 90, near field processor 100, and speech processor 110) can be performed by processor 208 through instructions stored on the memory 210. Note that some of these circuit components, and their associated digital signal processes, may be alternatively implemented by hardwired logic circuits (for example, dedicated digital filter blocks, hardwired state machines.)

Various aspects descried herein may be embodied, at least in part, in software. That is, the techniques may be carried out in an audio processing system in response to its processor executing a sequence of instructions contained in a storage medium, such as a non-transitory machine-readable storage medium (for example DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms "analyzer", "separator", "renderer", "estimator", "processor", "calculator", "combiner", "synthesizer", "component," "unit," "module," and "logic" are representative of hardware and/or software configured to perform one or more functions. For instance, examples of "hardware" include, but are not limited or restricted to an integrated circuit such as a processor (for example, a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (for example, an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

User Data

As described above, one aspect of the present technology is the gathering and use of data available from various sources such as microphones to process sound for speech processing. The present disclosure contemplates that in some instances, this gathered data may include personal information data that uniquely identifies or can be used to contact or locate a specific person. Such personal information data can include demographic data, location-based data, telephone numbers, email addresses, TWITTER ID's, home addresses, data or records relating to a user's health or level of fitness (for example, vital signs measurements, medication information, exercise information), date of birth, or any other identifying or personal information.

The present disclosure recognizes that the use of such personal information data, in the present technology, can be used to the benefit of users. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates aspects in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (for example, date of birth, etc.), controlling the amount or specificity of data stored (for example, collecting location data a city level rather than at an address level), controlling how data is stored (for example, aggregating data across users), and/or other methods.

Therefore, although the present disclosure broadly covers use of personal information data to implement one or more various disclosed aspects, the present disclosure also contemplates that the various aspects can also be implemented without the need for accessing such personal information data. That is, the various aspects of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method for processing sound for speech recognition, comprising:
   receiving a first signal from a first microphone of a device and a second signal from a second microphone of the device, the first and second microphones capturing sounds from a sound field;

processing the first signal and the second signal including converting the first signal and the second signal to frequency domain;

calculating a first ratio between a first acoustic pressure and a first particle velocity of the sound field, based on the first signal and the second signal in the frequency domain; and processing the first signal or the second signal for speech in response to the first ratio being greater than a threshold.

2. The method of claim 1, wherein a determination of the first particle velocity includes computing a finite difference approximation between the first signal and the second signal.

3. The method of claim 1, wherein a determination of the first particle velocity includes computing a difference between an acoustic pressure of the first signal and an acoustic pressure of the second signal.

4. The method of claim 1, wherein the processing of the first signal and the second signal includes calculating a power spectral density (PSD) or average of the first signal and second signal, and the first acoustic pressure and the first particle velocity is based on the PSD or average of the first signal and second signal.

5. The method of claim 1, wherein a determination of the first acoustic pressure includes computing an acoustic pressure of the a) first signal, b) the second signal, or c) the first signal summed or averaged with the second signal.

6. The method of claim 1, wherein the calculation of the first ratio is based on frequencies between 85 Hz and 255 Hz of the first signal and the second signal.

7. The method of claim 1, wherein a determination of the first particle velocity comprises computing i) a finite difference approximation between the first signal and the second signal, or ii) a difference between an acoustic pressure from the first signal and an acoustic pressure from the second signal.

8. The method of claim 1, wherein processing the first signal or the second signal for speech comprises performing an automatic speech recognition process that yields recognized speech, the method further comprising performing an action based on the recognized speech.

9. The method of claim 1, wherein a determination that a sound originated in a near field is based on the first ratio exceeding the threshold, and the determination relies only on microphones.

10. The method of claim 1, wherein the device is a headset.

11. The method of claim 10, wherein the first microphone and second microphone are both located on a first side of the headset worn on a side of a wearer's head.

12. The method of claim 11, wherein the first microphone and second microphone are located along an axis that aligns with a mouth of the wearer.

13. The method of claim 12, wherein a distance between the first microphone and second microphone is 5 mm to 40 mm.

14. The method of claim 1, further comprising:

receiving a third signal from a third microphone of the device and a fourth signal from a fourth microphone of the device;

processing the third signal and the fourth signal including converting the third signal and the fourth signal to the frequency domain;

verifying whether to process the first, second, third or fourth signals for speech recognition, based on a) comparing the first ratio with a second ratio, wherein the second ratio is a ratio calculated between a second acoustic pressure and a second particle velocity of the sound field, the second acoustic pressure and the second particle velocity being based on the third signal and the fourth signal, b) comparing the first acoustic pressure with the second acoustic pressure, or c) comparing the first particle velocity with the second particle velocity.

15. An audio system for processing sound, comprising:
a first microphone;
a second microphone; and
a processor, configured to:

receive a first signal from a first microphone and a second signal from a second microphone, the first and second microphone capturing sounds from a sound field;

process the first signal and the second signal including converting the first signal and the second signal to frequency domain;

determine a first acoustic pressure of the sound field based on a) the first signal, b) the second signal, or c) the first signal and the second signal, in the frequency domain;

determine a first particle velocity of the sound field based on a difference between the first signal and the second signal;

calculate a first ratio between the first acoustic pressure and the first particle velocity; and in response to the first ratio being greater than a threshold, determine whether a sound from the sound field is emanating from a near field or a far field.

16. The audio system according to claim 15, wherein the processor is further configured to perform a speech signal enhancement process on the first signal or the second signal based on a determination that the sound is emanating from the near field.

17. The audio system according to claim 15, wherein the first microphone and second microphone are located on a first side of a headset along an axis that aligns with a mouth of a user wearing the headset.

18. The audio system according to claim 17, wherein a distance between the first microphone and second microphone is 5 mm to 40 mm.

19. The audio system, according to claim 15 wherein to determine the first particle velocity the processor computes i) a finite difference approximation between the first signal and the second signal, or ii) a difference between an acoustic pressure from the first signal and an acoustic pressure from the second signal.

20. An article of manufacture for processing sound, comprising: a non-transitory machine-readable storage medium that stores instructions which, when executed by a processor, receive a first signal from a first microphone and a second signal from a second microphone, the first and second microphones capturing sounds from a sound field;

process the first signal and the second signal including converting the first signal and the second signal to frequency domain;

calculate a ratio between an acoustic pressure and a particle velocity of the sound field in the frequency domain, based on the first signal and the second signal; and perform speech signal processing on the first signal or the second signal based on the calculated ratio.

21. The article of manufacture of claim 20 wherein the stored instructions configure the processor to determine the particle velocity by computing i) a finite difference approximation between the first signal and the second signal, or ii) a difference between an acoustic pressure from the first signal and an acoustic pressure from the second signal.

* * * * *